Figure 2:
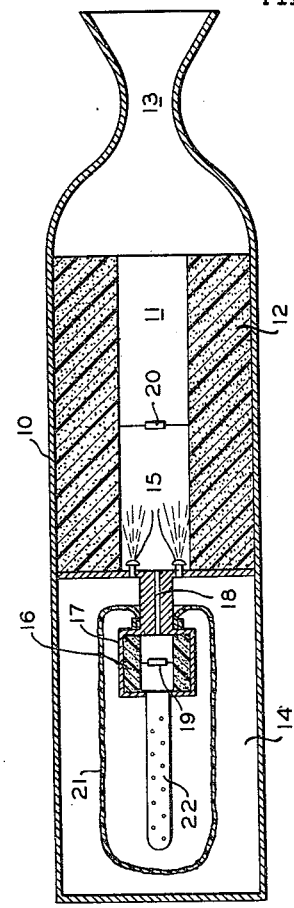

Dec. 18, 1962  H. M. FOX  3,068,641
HYBRID METHOD OF ROCKET PROPULSION
Filed April 18, 1955

INVENTOR.
H. M. FOX
BY Hudson and Young
ATTORNEYS

United States Patent Office 3,068,641
Patented Dec. 18, 1962

3,068,641
HYBRID METHOD OF ROCKET PROPULSION
Homer M. Fox, Bartlesville, Okla., assignor, by mesne assignments, to the United States of America as represented by the Secretary of the Air Force
Filed Apr. 18, 1955, Ser. No. 502,154
4 Claims. (Cl. 60—35.4)

This invention relates to rocket motors utilizing solid propellants and to an improved method for operating such motors. In one of its more specific aspects this invention relates to a method of utilizing a liquid oxidant with a fuel-rich solid rocket propellant. In another of its more specific aspects this invention relates to an improved rocket motor adapted to supply additional oxidant to a fuel-rich propellant utilized therein.

Recently it has been discovered that superior solid propellant mixtures are obtained comprising a solid oxidant such as ammonium nitrate or ammonium perchlorate and a rubbery binder material such as a copolymer of butadiene and a vinylpyridine or other substituted heterocyclic nitrogen base compound, which after incorporation, is cured by a quaternization reaction or a vulcanization reaction. Solid propellant mixtures of this nature and a process for their production are disclosed and claimed in copending application Serial No. 284,447, filed April 25, 1952, now Patent No. 3,003,861, by W. B. Reynolds and J. E. Pritchard.

The above described propellant compositions have been found to be superior rocket propellant materials as well as superior gas generating materials, for generation of large volumes of gases at elevated temperatures and pressures, applicable in many industrial systems wherein large bursts of power are required for relatively short time. Such propellant materials, when compounded with a sufficient amount of binder so as to render the final composition sufficiently pliable for formation of shaped charges, are deficient in oxygen for complete combustion. The stoichiometric amount of ammonium nitrate is about 94 weight percent ammonium nitrate with about 6 weight percent hydrocarbon fuel such as represented by the binder composition. Two component propellant charges ordinarily contain about 80–90 percent ammonium nitrate and such propellant compositions present problems in the fabrication of shaped charges.

It is an object of this invention to provide a method for improving the performance of fuel-rich propellant mixtures.

It is also an object of this invention to provide a novel rocket motor wherein the burning of a solid propellant charge is improved by the concomitant introduction of an additional source of oxygen to the combustion chamber.

It is still a further object of this invention to supplement the oxidant in a solid propellant with a liquid oxidizing agent.

It is still another object of this invention to provide a method of firing a rocket wherein a two-component solid propellant can be used wherein an excess of binder is used in its fabrication.

Figure 3:
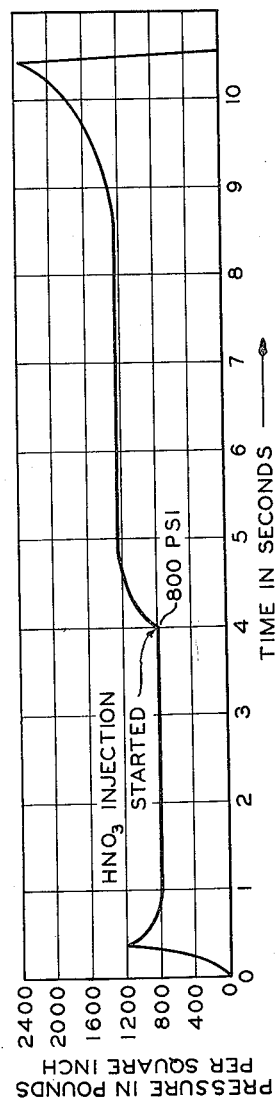
Figure 1:
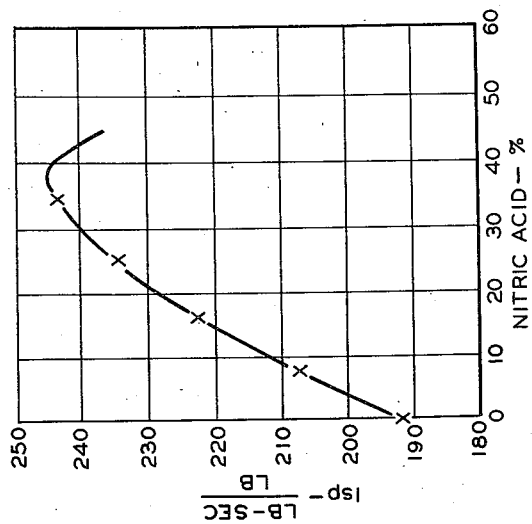

Other and further objects and advantages of this invention will be apparent to one skilled in the art upon studying this disclosure including the drawing wherein:

FIGURE 1 is a graphic illustration of the increase in performance of a solid propellant by the addition of an oxidizing agent to the combustion zone, FIGURE 2 is a schematic sectional elevation of a rocket motor illustrating one embodiment of this invention, and FIGURE 3 is a reproduction of a pressure-time trace obtained during the firing of a solid propellant and showing the effects obtained by the addition of nitric acid.

Broadly, the invention is directed to the addition of a supplemental source of oxygen to the combustion of a solid propellant. The performance of a rocket motor utilizing one type of solid propellant is increased from about 195 lb.-sec./lb. for the solid propellant alone to about 245 lb.-sec./lb. for the maximum performance achieved with a ratio of nitric acid to total propellant of about 0.38. Hydrogen peroxide has a higher weight percent oxygen and better thermal properties than does nitric acid, however, hydrogen peroxide also has the disadvantages of thermal instability and chemical instability. A greater amount of hydrogen peroxide is required than nitric acid to achieve the same performance with most solid propellant, except near the maximum performance where hydrogen peroxide surpasses nitric acid. Other oxidizers include oxygen, ozone, air, and nitrous oxide. While liquid propellants in general have the disadvantage of requiring pumps, the problem is much reduced in this invention, since only one liquid is involved and a source of pressurizing gas is available for pumping the liquid.

A solid propellant containing ammonium nitrate or ammonium perchlorate and a rubbery binder material such as that previously described is preferred in the practice of this invention, however, any solid propellant which has a ratio of fuel to oxidant greater than stoichiometric is applicable in the practice of this invention. Other fuel-rich solid propellants include ammonium nitrate and an asphalt binder and ammonium nitrate or ammonium perchlorate and various binder materials such as Thiokol polysulfide rubber, polyvinylchloride, etc.; and nitro guanidine sodium nitrate or potassium nitrate with suitable binder materials such as those set forth above.

A novel solid propellant which is applicable in the practice of the method of this invention is one comprising ammonium nitrate oxidant, conjugated diene-heterocyclic nitrogen base compound copolymer, and a metal such as aluminum, beryllium, boron, lithium and magnesium. The metal, preferably finely divided, can be incorporated into the propellant mixture up to about 20 parts, such as the range 1 to 20 parts by weight. The preferred range is 5 to 15 parts and the metal replaces the ammonium nitrate part for part in the propellant composition.

The preferred propellant of this invention broadly contains 50–90 parts by weight of ammonium nitrate, 10–50 parts by weight of binder material comprising a copolymer of a diene and a vinylpyridine, and 1–2 parts of a burning rate catalyst. A more preferred range is 75–80 parts ammonium nitrate, 20–25 parts binder, and 1–2 parts of a burning rate catalyst.

Burning rate catalysts which can be used include ferrocyanides such as Milori blue, Prussian blue, etc., metal oxides such as ferric oxide, lead dioxide, etc., ammonium dichromate, potassium dichromate and other known catalysts.

Referring now to FIGURE 1 of the drawing, a theoretical increase in performance which is effected by adding nitric acid to the combustion process of a solid propellant as hereinbefore described, is graphically illustrated. A maximum specific impulse of 245 seconds at 1000 p.s.i. combustion chamber pressure, is achieved at a ratio of nitric acid to total propellant of about 0.038. The nitric acid is considered as part of the total propellant. This means that for maximum performance about 0.6 pound of nitric acid will be required for every pound of solid propellant. These calculations were based on a 80/20/2 ammonium nitrate/butadiene-methyl vinylpyridine copolymer binder/Milori blue propellant composition. The stoichiometric amount of nitric acid would be about 0.8 pound of nitric acid per pound of solid propellant. Thus the optimum performance occurs at about 75 percent of the stoichiometric amount of nitric acid. Therefore, because of the optimum performance at less than the stoichiometric amount of added oxidant and because of the corrosion problems which occur with an oxidant-rich ratio of oxidant to fuel, I prefer to operate with between 60 and 85 and more preferably between 70 and 80 percent of the stoichiometric amount of added oxidant. Less than these amounts can be used and sometimes an excess of oxidant results in an economic advantage.

As an example of one embodiment of this invention, reference is made to FIGURE 2 wherein a rocket motor 10 is schematically illustrated. Combustion chamber 11 contains solid propellant charge 12 which provides thrust for the rocket motor by evolution of gases which are exhausted through exhaust nozzle 13. Container 14 contains supplemental oxidant, such as fuming nitric acid. Nozzles 15 communicate with tank 14 and combustion chamber 11 and are closed for example by fusible plugs which are melted upon ignition of the propellant charge and allow liquid oxidizer to flow into the combustion chamber. An auxiliary charge of solid propellant 16 is positioned in an auxiliary combustion chamber 17 within propellant tank 14 in communication with main combustion chamber 11 by orifice 18. Ignition means indicated at 19 and 20 are used so as to simultaneously ignite solid propellant charges 16 and 12. Expellant bag 21 is attached to the container of the propellant charge in tank 14 and perforated tube 22 connects the interior of auxiliary combustion chamber 17 with the interior of expellant bag 21.

The auxiliary propellant charge 16 is adapted so as to burn for a period of time at least equal to that of the main propellant charge 12. This can be done in various ways, for example, by utilizing a propellant for the charge 16 which is slower burning than the charge 16. An ammonium nitrate/diene-vinylpyridine copolymer propellant can be rendered slower burning by omitting the burning rate catalyst. Another method for providing a burning charge 16 having the same burning time as the propellant charge 12 is by utilizing an end-burning charge 16. Other methods can also be utilized for providing a charge 16 having a burning time at least as long as charge 12.

Expellant bag 21 can be made of any flexible material which is not affected by fuming nitric acid, when that oxidant is used, such as polymerized tetrafluoroethylene. A flexible metal bellows can also be used. Polybutadiene is a material which can be used with some oxidants at low temperatures such as liquid oxygen. Polyethylene can be used with oxygen, hydrogen peroxide and other oxidants.

Orifice 18 in auxiliary combustion chamber 17 is calibrated so that the pressure developed in chamber 17 is greater than that developed in chamber 11 so that the supplemental oxidant is injected into the combustion chamber 11 at high velocity.

A better understanding of the invention may be obtained by reference to the following example which illustrates the invention but should not be used to unduly limit the invention.

EXAMPLE

A solid propellant comprising a propellant grain in the form of a restricted solid plug 4.1 inches in length, 3.025 inches in diameter, and weighing 799 grams was positioned in a combustion chamber. Composition of the propellant grain in parts by weight was 82.5 ammonium nitrate, 17.5 binder, and 2.0 parts Milori blue. Composition of the binder components in parts by weight was 100 butadiene-methylvinylpyridine copolymer, 20 medium abrasion furnace carbon black, 10 benzophenone, 10 Pentaryl A (amylbiphenyl), 1.0 tert-butylsulfenyl dimethyldithiocarbamate, 3.0 Fexamine (a physical mixture containing 65 percent of a complex diarylamine ketone reaction product and 35 percent N,N-diphenyl-p-phenylene diamine), 3.0 zinc oxide, 1.0 Aerosol OT (dioctyl ester of sodium sulfosuccinic acid), and 0.75 sulfur. The restrictor, which was tape over smeared rubber, covered the grain except for one end. The igniter weighed 0.9 gram and was taped to the surface to be ignited.

The charge was ignited and after about 4 seconds white fuming nitric acid was injected into the combustion chamber at a rate of 6.3 cc. per second. A pressure-time trace obtained during the firing of the grain is shown in FIGURE 3. Examination of FIGURE 3 shows that injection of nitric acid caused the chamber pressure to increase from about 800 to about 1250 p.s.i. This corresponds to an increase in C* (characteristic velocity in feet per second) of about 200 feet per second (about 4000 to 4200) or an increase in specific impulse of about 20 seconds (195 to 215).

A solid propellant as hereinabove described with 80 percent ammonium nitrate requires 0.7 pound of hydrogen peroxide per pound of propellant to achieve maximum performance. The main charge of solid propellant and the pressurizing propellant, which may be the same or different, are preferably ignited simultaneously. Hydrogen peroxide is injected into the combustion chamber where it supplements the burning of the solid propellant in the same manner as fuming nitric acid. The exhaust products of a solid propellant as hereinbefore described fired in conjunction with either fuming nitric acid or hydrogen peroxide produces exhaust products which are substantially smokeless and non-toxic. This combination of liquid and solid propellant achieves a maximum loading performance and allows flexibility for a wide range of applications.

The amount of additional oxidizer preferred for various solid propellant compositions is shown in the following Table I.

Table I

| Solid Propellant: | | | |
| --- | --- | --- | --- |
| Binder | 10-50 | 10-50 | 10-50 |
| Ammonium Nitrate | 50-90 | 50-90 | 10-89 |
| Boron | | | 1-80 |
| Oxidizer: | | | |
| $HNO_3$ | 5-250 | | 10-400 |
| $H_2O_2$ | | 10-340 | |

Reasonable variations and modifications are possible within the scope of the disclosure of the present invention, the essence of which is a method for increasing the specific thrust of a solid propellant comprising injecting a supplemental source of oxygen into the combustion chamber during combustion of the propellant.

That which is claimed is:

1. The method of developing thrust which comprises ejecting from a combustion chamber the gaseous products produced by combustion of a solid propellant comprising about 50 to 90 parts by weight ammonium nitrate, 1 to 20 parts by weight of a metal selected from the group consisting of aluminum, magnesium, boron, beryllium, and lithium, 10 to 50 parts by weight butadiene-methylvinylpyridine copolymer, and 1 to 2 parts by weight Milori blue; and fuming nitric acid, wherein the nitric acid is added in an amount of not more than 0.8 part by weight per part by weight of solid propellant and between 60 and 85 percent of the stoichiometric amount of liquid oxidizing agent.

2. In a method for developing thrust which comprises ejecting from a combustion chamber the gaseous products produced by combustion of a solid rocket propellant composition wherein the ratio of fuel to oxidizer is greater than stoichiometric, comprising a solid inorganic oxidizing salt selected from the group consisting of ammonium perchlorate and ammonium nitrate, a rubbery binder comprising a copolymer of a conjugated diene and a heterocyclic nitrogen compound, the improvement which comprises injecting a liquid oxiding agent into said combustion chamber in an amount of not more than 0.8 parts by weight per part by weight of solid propellant and between 60 and 85 percent of the stoichiometric amount of liquid oxidizing agent.

3. In a method for developing thrust which comprises ejecting from a combustion chamber the gaseous products produced by combustion of a solid propellant comprising a solid inorganic oxidizing salt selected from the group consisting of ammonium perchlorate and ammonium nitrate, a rubbery binder comprising a copolymer of a conjugated diene having 4 to 8 carbon atoms per molecule and a $CH_2\!=\!C^R$ substituted heterocyclic nitrogen base selected from the group consisting of pyridine, quinoline, alkyl substituted pyridine, and alkyl substituted quinoline, wherein the total number of carbon atoms in the nuclear alkyl substituents is not more than 15 and wherein R is selected from the group consisting of hydrogen and a methyl radical, the improvement which comprises increasing the thrust produced by injecting a liquid oxidizing agent into said combustion chamber wherein the liquid oxidizing agent is added in an amount of not more than 0.8 part by weight per part by weight of solid propellant and between 60 and 85 percent of the stoichiometric amount of liquid oxiding agent.

4. The method of increasing the thrust developed by burning in a combustion zone a solid rocket propellant comprising a solid inorganic oxidizing salt selected from the group consisting of ammonium perchlorate and ammonium nitrate and a fuel wherein the ratio of fuel to oxidizer is greater than stoichiometric, which method comprises injecting a liquid oxidizing agent into said combustion zone in an amount of about 60 to 85 percent of the stoichiometric amount of liquid oxidizing agent, injecting an additional, fluid oxidizing agent in a quantity not greater than 0.8 part of liquid oxidizer per part of propellant, into the combustion gases formed and ejecting resulting gases as a thrust producing stream.

References Cited in the file of this patent
UNITED STATES PATENTS

| | | |
|---|---|---|
| 1,506,322 | O'Neill | Aug. 26, 1924 |
| 1,506,323 | O'Neill | Aug. 26, 1924 |
| 2,433,943 | Zwicky et al. | Jan. 6, 1948 |
| 2,477,549 | Van Loenen | July 26, 1949 |
| 2,622,277 | Bonell et al. | Dec. 23, 1952 |
| 2,648,190 | Maisner | Aug. 11, 1953 |
| 2,683,963 | Chandler | July 20, 1954 |
| 2,711,630 | Lehman | June 28, 1955 |
| 2,740,702 | Mace | Apr. 3, 1956 |
| 2,791,883 | Moore et al. | May 14, 1957 |
| 2,857,258 | Thomas | Oct. 21, 1958 |
| 2,970,046 | Cutforth | Jan. 31, 1961 |
| 2,987,389 | Proell et al. | June 6, 1961 |